United States Patent [19]
Tozawa et al.

[11] Patent Number: 5,607,785
[45] Date of Patent: Mar. 4, 1997

[54] POLYMER ELECTROLYTE ELECTROCHEMICAL CELL AND PROCESS OF PREPARING SAME

[75] Inventors: Takeshi Tozawa; Nobuhito Toshima, both of Kanagawa, Japan

[73] Assignees: Tanaka Kikinzoku Kogyo K.K.; M. Watanabe, both of Japan; Stonehart Associates Inc., Madison, Conn.

[21] Appl. No.: 540,938

[22] Filed: Oct. 11, 1995

[51] Int. Cl.$^6$ ................................................. H07M 8/10
[52] U.S. Cl. .......................... 429/33; 429/42; 429/44; 427/115; 427/201
[58] Field of Search .................. 429/33, 38, 42, 429/44; 427/115, 195, 201, 216, 292

[56] References Cited

U.S. PATENT DOCUMENTS

| | | | |
|---|---|---|---|
| 4,855,193 | 8/1989 | McElroy | 429/44 X |
| 5,294,232 | 3/1994 | Sakairi et al. | 502/101 X |
| 5,456,991 | 10/1995 | Ong et al. | 429/44 |
| 5,472,799 | 12/1995 | Watanabe | 429/33 X |

*Primary Examiner*—Stephen Kalafut
*Attorney, Agent, or Firm*—Klauber & Jackson

[57] ABSTRACT

Disclosed herein are several aspects processes of preparing a polymer electrolyte electrochemical cell in which supply of a reaction gas and discharge of an obtained gas can be smoothly conducted. This can be achieved by forming through apertures in a cathode or by forming a gradient of ion exchange resin concentration of a catalyst particle cluster size.

10 Claims, 6 Drawing Sheets

5,607,785

POLYMER ELECTROLYTE ELECTROCHEMICAL CELL AND PROCESS OF PREPARING SAME

BACKGROUND OF THE INVENTION

The present invention relates to an electrochemical cell employing a solid polymer electrolyte membrane (ion exchange membrane) such as a fuel cell, an electrolytic cell, a sensor and the like in which supply of a reaction gas and discharge of an obtained gas can be smoothly conducted to obtain an elevated limiting output in the practical range and to a process of preparing same.

Since a solid polymer electrolyte electrochemical cell, for example, a solid polymer electrolyte membrane fuel cell is much compact and can take out a higher current density than a phosphoric acid fuel cell, it is attracting much attention as an electric source of an automobile and a space craft. Also in the development in this technical field, various proposals for electrode structures, processes of preparing a catalyst and system constitutions have been made. FIG. 1 schematically shows a principle and a constitution of a polymer electrolyte fuel cell in which an anode side gas diffusion electrode 4A consisting of an anode side porous catalyst layer 2A and an anode side hydrophobic porous current collector layer 3A bonded with each other is bonded to one surface of an ion exchange membrane 1, and a cathode side gas diffusion electrode 4C consisting of a cathode side porous catalyst layer 2C and a cathode side hydrophobic porous current collector layer 3C bonded with each other is bonded to the other surface of the ion exchange membrane 1. A separator 6A having reaction gas supply grooves 5A is in contact with the anode side gas diffusion electrode 4A and current collecting portions 7A are constituted between the adjacent supply grooves 5A of the separator 6A. Similarly, a separator 6C having reaction gas supply grooves 5C is in contact with the cathode side gas diffusion electrode 4C and current collecting portions 7C are constituted between the adjacent supply grooves 5C of the separator 6C. The fuel cell is prepared by hotpressing the five components. By connecting the both current collector portions 7A and 7C with a lead having a load 8 and supplying hydrogen to the anode and oxygen to the cathode, electric power can be taken out through the load 8.

FIG. 2 is an enlarged sectional view of the fuel cell of FIG. 1 showing the exemplified fine structure of the anode and cathode catalyst layers 2A, 2C.

In this conventional polymer electrolyte fuel cell, electroconductive unwoven fabric hydrophobically treated is employed as the above current collector not for preventing the gas flow as much as possible. However, especially in a high current density operation in which the mass transfer is rate-determining, the gas supply is insufficient even with the unwoven fabric so that since the reverse direction mass transfers, that is, the supply of an oxidation gas and the discharge of water vapor must be performed on a single plane, the supply of the oxidation gas is likely to be insufficient resulting in the lowering of the voltage in the high current density region.

Further as the support of the catalyst layer of the fuel cell, carbon particles are employed which are mixed with ion exchange resin and integrated by means of hotpressing or the like to form the catalyst layer. The catalyst layer thus formed is packed making no spaces, and because the carbon particles are spherical and are firmly adhered with one another by means of the hotpressing to increase its density, the number of gas flow paths is small so that a reaction gas is difficult to diffuse in the catalyst layer and to reach to a reaction point and in addition the discharge of water vapor after the reaction cannot be smoothly conducted. Accordingly, the supply of the reaction gas becomes further difficult to largely lower the reaction efficiency on the catalyst layer to only take out energy significantly lower than the maximum output.

SUMMARY OF THE INVENTION

In view of the above drawbacks, an object of the present invention is to provide a solid polymer electrolyte fuel cell, especially a fuel cell, and a process of preparing same in which the supply of a reaction gas and the discharge of an obtained gas may be smoothly conducted and the maximum output can be obtained.

Another object of the present invention is to provide a solid polymer electrolyte fuel cell and a process of preparing same in which a stable operation can be performed especially at a higher current density region by means of smoothing the mass transfer.

A first aspect of the present invention is a polymer electrolyte electrochemical cell comprising, in this turn, a cathode current collector, a cathode catalyst layer, a solid polymer electrolyte membrane, an anode catalyst layer and an anode current collector, the cathode current collector being an electroconductive unwoven fabric and having apertures open to at least a surface which is in contact with a gas.

According to the first aspect of the invention, water produced through the electrode reaction can be discharged in the form of liquid through the apertures, and accordingly the supply of an oxidation gas can be smoothly performed so that a stabler operation at a high voltage can be conducted even at a higher current density compared with an operation of a conventional electrochemical cell.

A second aspect of the present invention is a polymer electrolyte electrochemical cell comprising, in this turn, a cathode current collector, a cathode catalyst layer, a solid polymer electrolyte membrane, an anode catalyst layer and an anode current collector, the both catalyst layers being formed by cluster particles comprising catalyst particles composed of a catalyst support carrying a catalyst metal and ion exchange resin characterized in that the catalyst particles are so distributed that the particle size of the cluster particles of at least one of the two catalyst layers nearer to the solid polymer electrolyte membrane is smaller than that of the cluster particles nearer to the current collector.

A third aspect of the present invention is a polymer electrolyte electrochemical cell comprising, in this turn, a cathode current collector, a cathode catalyst layer, a solid polymer electrolyte membrane, an anode catalyst layer and an anode current collector, the both catalyst layers being formed by cluster particles comprising catalyst particles composed of a catalyst support carrying a catalyst and ion exchange resin characterized in that the cluster particles are so distributed that the concentration of the ion exchange resin of at least one of the two catalyst layers nearer to the solid polymer electrolyte membrane is higher than that of the ion exchange resin nearer to the current collector.

According to the second and third aspects, the supply of the reaction gas and the discharge of the obtained gas can be smoothly conducted through the catalyst layer, and the reaction between the anode gas and the cathode gas can be accelerated.

While the gas permeability elevates with the increase of the particle size of the agglomerated catalyst particles, the catalyst utilization decreases with the increase thereof. While, conversely, the gas permeability lowers with the decrease of the particle size, the catalyst utilization increases. Accordingly, in accordance with the second aspect of the present invention, the electrochemical cell such as the fuel cell capable of procuring the high output and of conducting smooth supply of the reaction gas and smooth discharge of the obtained gas can be prepared in which the gas permeability of the catalyst layer close to the current collector which is not required to elevate the catalyst utilization increases, and the catalyst utilization close to the polymer electrolyte membrane which is not required to elevate the gas permeability increases.

Proton conducts more easily or the reaction is smoothly carried out with the increase of the concentration of the ion exchange resin, and the gas permeability becomes excellent with the decrease of the concentration. Accordingly, the high and low concentrations of the said resin possess similar effects to those of the large and small particle sizes of the agglomerated catalyst particles of the second aspect of the present invention in connection with the performance of the electrochemical cell. An electrochemical cell capable of procuring the high output and of conducting smooth Supply of the reaction gas and smooth discharge of the obtained gas similar to that of the second aspect can be obtained by increasing the concentration of the ion exchange resin close to the polymer electrolyte membrane side and by decreasing that close to the current collector side.

The electrochemical cell of the second aspect can be prepared by positioning the dispersion of the catalyst particles covered with the ion exchange resin on at least one of the two current collectors, plainly sedimenting the particles and filtering them on the current collector. An extremely simple means of stirring followed by standing of the dispersion before the filtration enables the preparation of the electrochemical cell having more excellent performance than a conventional one.

The electrochemical cell of the third aspect may be prepared by piling catalyst layers having the different ion exchange resin concentrations and stacking the layers from the polymer electrolyte membrane side, in turn of the maximum concentration to lower concentration.

Although this method is more time-consuming than that of the second aspect, the saving of the relatively expensive ion exchange resin can be attained and the maximum efficiency can be produced by employing the minimum amount of the resin.

The catalyst layer comprises a plurality of catalyst particles essentially consisting of a catalyst support and fine catalysts supported thereon and ion exchange resin, and the catalyst particles agglomerate with one another to form a cluster (agglomerated particle). When, with the increase of the degree of the agglomeration or the particle size of the cluster, a space formed among the clusters becomes large, the catalysts supported on the catalyst particles are difficult to be exposed to the above space, to lower the utilization of the catalyst inside of the clusters.

When the degree of the agglomeration is conversely small, the space formed among the clusters is small so that the catalysts supported on the catalyst particles are easily exposed to the above space to elevate the utilization of the catalyst. When the polymer electrolyte electrochemical cell is operated at a low current density, it is essential to elevate the catalyst utilization near the polymer electrolyte membrane for obtaining a high voltage because the reaction is likely to take place inside of the catalyst layer near the polymer electrolyte membrane. On the other hand, the space around the current collector relatively far from the polymer electrolyte membrane is considered to be less attributable to the low current density reaction so that the consideration about the elevation of the catalyst utilization is not so important. In consideration of the high current density operation, it is mainly requested to smoothly supply the reaction gas from the current collector side to the space around the polymer electrolyte membrane and to discharge the obtained gas.

Accordingly, in order to overcome these problems, the present inventor has paid attention to the degree of the catalyst particles or the particle size of the clusters and the concentration of the ion exchange resin covering the catalyst particles. By controlling at lease one of these factors, the polymer electrolyte electrochemical cell having the sufficient performance can be provided.

As mentioned, the polymer electrolyte electrochemical cell, especially the fuel cell essentially consists of the cathode current collector, the cathode catalyst layer, the solid polymer electrolyte membrane, the anode catalyst layer and the anode current collector, and the gas reaction proceeds with a hydrogen gas and an oxygen gas supplied from the anode current collector side and the cathode current collector side, respectively, through the respective catalyst layers to the polymer electrolyte membrane. If the degree of the agglomeration of the catalyst particles in the vicinity of the catalyst layer near the current collector to which the gas is supplied is high in this reaction, the gas supplied easily moves toward the polymer electrolyte membrane and reaches thereto because the space formed among the particles is large. In other words, the gas permeability of the catalyst layer of the current collector side is made excellent. Around the polymer electrolyte membrane, the degree of the agglomeration of the catalyst particles is low, that is, the larger part of the catalyst particle surface is exposed so that the reaction proceeds the same as or more quickly than a conventional reaction. While water vapor produced in the reaction moves toward the current collector and is discharged to outside of the system, the vapor is smoothly taken out also in this case because the degree of the agglomeration of the catalyst particles around the current collector is high.

After, in order to form a gradient of the degree of the agglomeration of the catalyst particles in the direction of the catalyst layer, a solution with the dispersed catalyst particles is allowed to stand for a while on the current collector for plainly sedimenting the catalyst particles to increase the density of the cluster particles having the larger particle size with the approach to the current collector side, the integration of the above five elements is conducted by means of a conventional hotpressing method or the like. The time required for the plain sedimentation changes depending on the particle size of the catalyst particles, the particle size distribution of the required clusters and the amount of the ion exchange resin. For example, in case of the average particle size of 1 μm and the distribution range of 0.2 to 2 μm, the sedimentation time is preferably more than five minutes. The appropriate cluster distribution in the direction of the thickness of the catalyst layer is difficult to be formed less than five minutes.

Other than the formation of the distribution of the degree of the distribution, two catalyst layers having different degrees of agglomeration from each other may be stacked to form one catalyst layer by means of an ordinary hotpressing method.

Other than the formation of the gradient of the degree of the agglomeration of the catalyst particles, the gradient of ion exchange resin in the direction of the electrode thickness can be formed in the present invention by preparing separate catalyst particles having the different ion exchange resin amounts when the catalyst particles arc coated with the ion exchange resin and employing these catalyst particles.

When the concentration of the ion exchange resin (for example, Nafion, the tradename of Du Pont) is high, the conduction of proton easily takes place but the gas permeability lowers. When, on the other hand, the concentration is low, the conduction of the proton is difficult to take place but the gas permeability increases.

When, accordingly, the ion exchange resin concentration of the polymer electrolyte membrane side is higher and that of the current collector side is lower, a fuel cell having high ionic conductivity and excellent gas permeability can be provided similar to the fuel cell having the controlled degree of the catalyst particles.

In the operation of such a polymer electrolyte electrochemical cell as a fuel cell, the gas diffusion in the electrode is rate-determining in the high current density region. Especially at the cathode, the volume of water generated in the high current density region is large so that it is required to discharge the said water for effectively introducing an oxygen gas to the catalyst surface, that can be achieved by the present invention. Similarly, in the low current density region, the promotion of the gas supply and the gas discharge enables the procurement of high output.

Electroconductive material such as a carbon paper, a porous carbon unwoven fabric, a carbon fabric, a carbon plate and the like which are employed as a conventional current collector may be employed in the present invention. The said material may be hydrophobically treated.

The catalyst support supporting the catalyst may preferably be conventional carbon black which may be supported on carbon single fibers, and the both of the said fibers and the support catalyst are included in the present invention.

As the catalyst of the electrode of the present invention, such a precious metal as platinum, palladium and ruthenium can be employed. As the ion exchange resin, perfluorocarbon sulphonic acid or the like may be employed. Hydrophobic resin such as Teflon (tradename of Du Pont) may be mixed in the electrode catalyst layer.

DETAILED DESCRIPTION OF THE INVENTION

Figure 1:
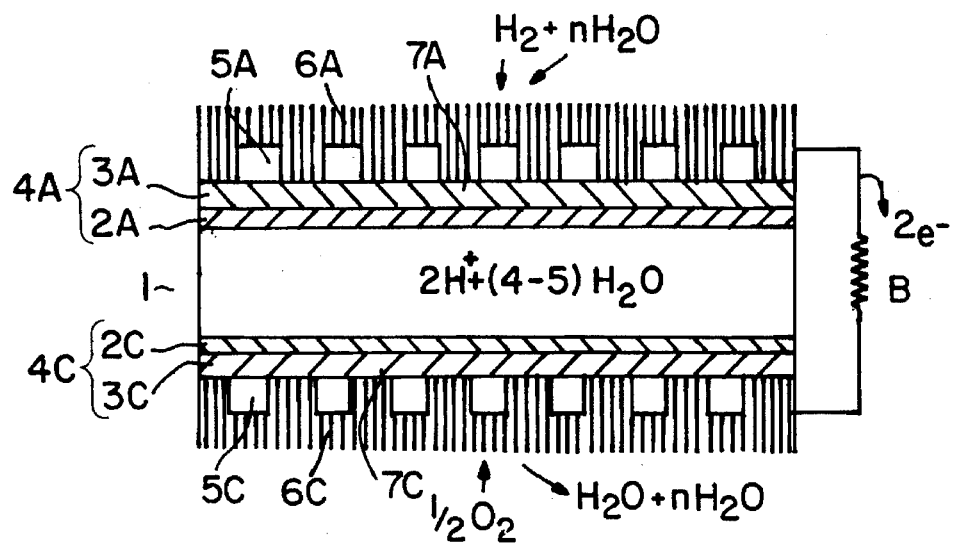
FIG. 1 is a schematic view showing a principle and constitution of a polymer electrolyte fuel cell.
Figure 2:
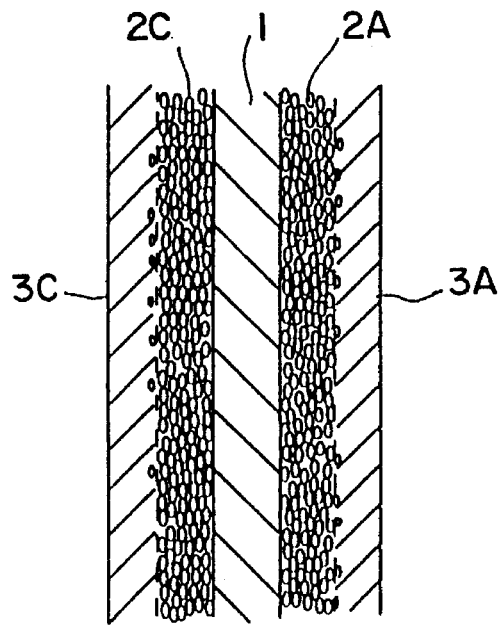
FIG. 2 is an enlarged sectional view of a conventional fuel cell.
Figure 3:
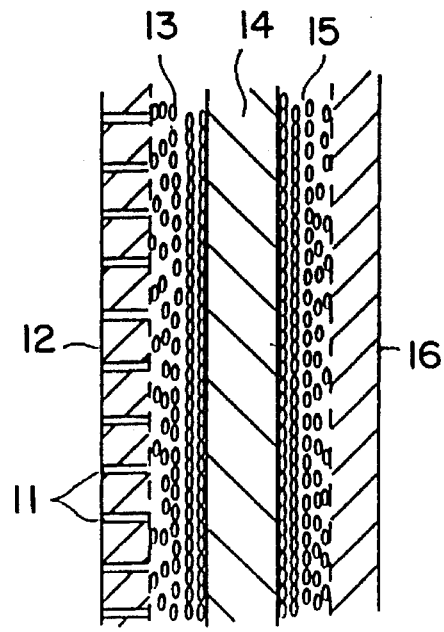
FIG. 3 is a cross sectional view of a fuel cell in accordance with a first embodiment of the present invention.

In FIG. 3, a fuel cell essentially consists of a cathode current collector 12, a cathode catalyst layer 13, an ion exchange membrane 14, an anode catalyst layer 15 and an anode current collector 16 stacked in this turn, and a plurality of through apertures 11 are perforated through the cathode current collector 12. The diameter of the apertures are preferably between 0.1 and 1.0 mm, and the number thereof is preferably four apvertures/cm$^2$ or more and more preferably the diameter is between 0.1 and 0.5 mm and the number is between 4 to 20 apertures/cm$^2$. No effects can be produced under the lower specified values, and the retention of the catalyst may be disadvantageously damaged over the upper specified value.

The cathode current collector is made of electroconductive unwoven fabric such as a carbon paper having hydrophobicity and the like. The apertures are preferably perforated through the electroconductive unwoven fabric in the direction of its thickness. A method of forming the catalyst layer on the current collector includes such an appropriate method as a filtration transfer method and a paste applying method.

Figure 4:
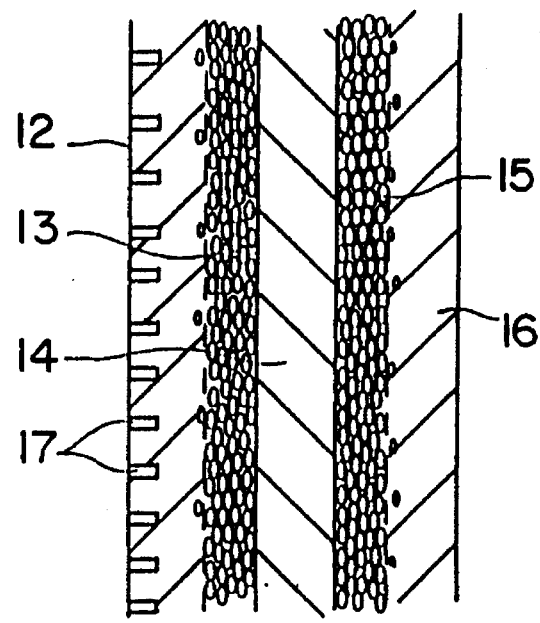
FIG. 4 is a cross sectional view of a fuel cell in accordance with a second embodiment of the present invention.
Figure 5:
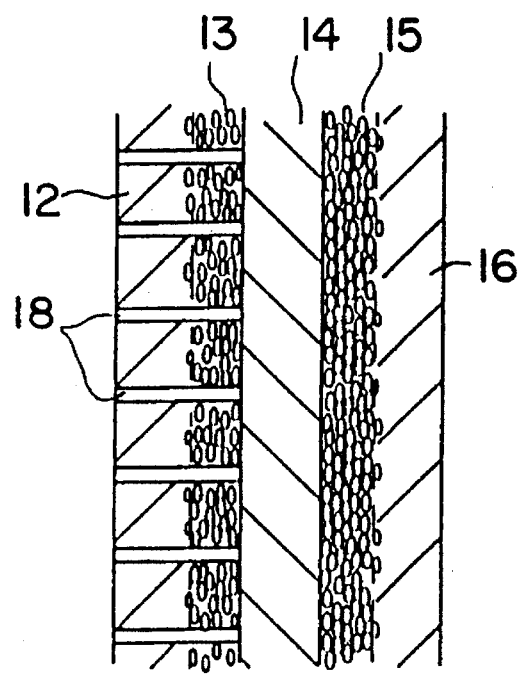
FIG. 5 is a cross sectional view of a fuel cell in accordance with a third embodiment of the present invention.

The fuel cells of FIGS. 4 and 5 are the improvements of the fuel cell of FIG. 3, and the description of the same components as those of FIG. 3 will be omitted by attaching the same numerals.

In the fuel cell of FIG. 4, in place of the through apertures 11 of FIG. 3, apertures 17 having the respective bottoms are formed in the cathode current collector 12. In the fuel cell of FIG. 5, apertures 18 perforated through the cathode current collector 12 and the cathode catalyst layer 13 are formed.

Figure 6:
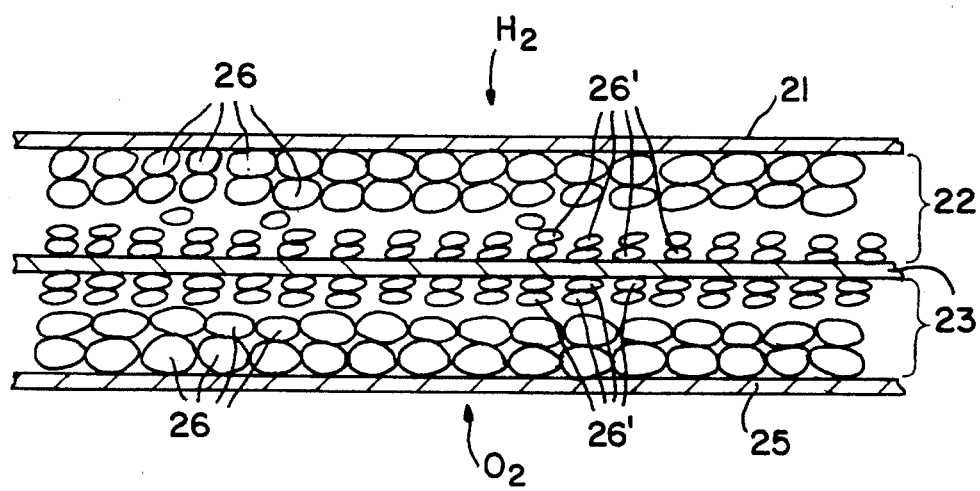
FIG. 6 is a cross sectional view of a fuel cell in accordance with a fourth embodiment of the present invention.

The fuel cell of FIG. 6 comprises, in this turn, an anode current collector 21, an anode catalyst layer 22, a solid polymer electrolyte membrane 23, a cathode catalyst layer 24 and a cathode current collector 25, and the particle size of the agglomerated catalyst particles of the both catalyst layers 22,24 is so controllably distributed that the particle size of the catalyst particles near the anode current collector 21 and the cathode current collector 25 increases with the approach to the current collectors and the that of the agglomerated catalyst particles 26' near the polymer electrolyte membrane 23 decreases with the approach to the membrane 23.

Figure 7:
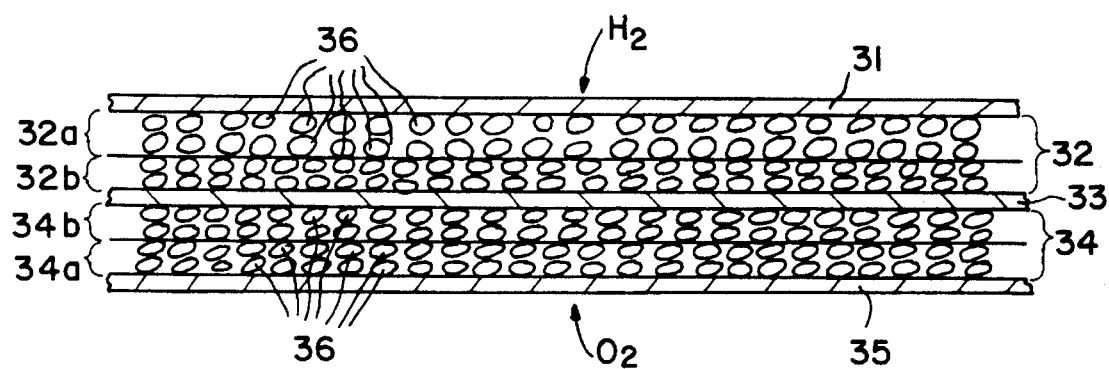
FIG. 7 is a cross sectional view of a fuel cell in accordance with a fifth embodiment of the present invention.

The fuel cell of FIG. 7 comprises, in this turn, an anode current collector 31, an anode catalyst layer 32, a solid polymer electrolyte membrane 33, a cathode catalyst layer 34 and a cathode current collector 35. The respective catalyst layers 32, 34 are composed of two layers 32a, 32b and 34a, 34b, respectively, stacked with each other by means of adhesion or the like. These layers 32a, 32b and 34a, 34b are composed of catalyst particles 36 formed by agglomeration of catalyst fine particles coated with ion exchange resin. The concentration of the ion exchange resin is so controlled that the concentration of the layers 32a and 34a closer to the anode current collector 31 and the cathode current collector 35 is low and that of the layers 32b and 34b closer to the polymer electrolyte membrane 33 is high.

EXAMPLES

Although Examples of the solid polymer electrolyte electrochemical cells and their preparation in accordance with the present invention will be illustrated, these are not construed to restrict the invention.

Examples 1 to 6

After 10 g of carbon powder was impregnated with a chloroplatinic acid aqueous solution (platinum concentration: 5 g/liter), a platinum-carbon catalyst of which a platinum support amount was 20% in weight was prepared by thermal decomposition treatment. The carbon catalyst was impregnated with a commercially available ion exchange resin dispersion solution [(Nafion (trademark of Du Pont) solution] followed by drying so as to form an ion exchange resin layer on the surface. The catalyst powder with the resin was fractionated so as to make an average platinum loading amount to be 0.3 mg/cm$^2$ and the fractionated powder was redispersed in alcohol.

Then, the dispersion was filtered under weak suction to adhere the catalyst powder on a filter paper with a small amount of the alcohol remaining on the filter paper. After the six filter papers were coldpressed at 25 kg/cm$^2$ with respective hydrophobically treated carbon papers of which a thickness was 360 μm functioning as a current collector and having through apertures of which an aperture size and the number were identified in Table 1 (Examples 1 to 6), a cathode was prepared by peeling of the filter paper. Similarly, an anode was prepared by employing a carbon paper having no apertures.

Then, Nafion (ion exchange membrane) having a thickness of 150 μm was disposed between the two sheets of the electrodes with the respective catalyst layers facing to each other, and hotpressed at a pressure of 5 kg/cm$^2$ and a temperature of 130 ° C. to obtain a polymer electrolyte fuel cell of Example 1 having the structure as shown in FIG. 3. Similarly, fuel cells of Examples 2 to 6 were obtained employing the respective electrode having the apertures identified in Table 1.

TABLE 1

|  | Example | | | | | |
|---|---|---|---|---|---|---|
|  | 1 | 2 | 3 | 4 | 5 | 6 |
| Aperture Size (mm) | 0.1 | 0.1 | 0.3 | 0.3 | 0.5 | 0.5 |
| Number/cm$^2$ | 20 | 10 | 15 | 8 | 10 | 4 |

Comparative Examples 1 to 3

Solid polymer electrolyte fuel cells of Comparative Examples 1 to 3 were obtained similarly to Examples 1 to 6 except that the respective cathodes without apertures or with apertures of which a size and the number were identified in Table 2.

TABLE 2

|  | Comp. Ex. 1 | Comp. Ex. 2 | Comp. Ex. 3 |
|---|---|---|---|
| Aperture Size (mm) | No Aperture | 0.8 | 0.8 |
| Number/cm$^2$ | — | 2 | 25 |

Employing the fuel cells of Examples 1 to 6 and Comparative Examples 1 to 3, the cell performances of the respective fuel cells were evaluated by measuring the respective limiting current density values under the following conditions.

The relation between the IR free current density (mA/cm$^2$) and the voltage (mV) obtained was measured at 80° C. in the respective fuel cells supplying hydrogen of atmospheric pressure and oxygen of atmospheric pressure to the anode and cathode, respectively. The results are shown in FIG. 8.

Figure 8:
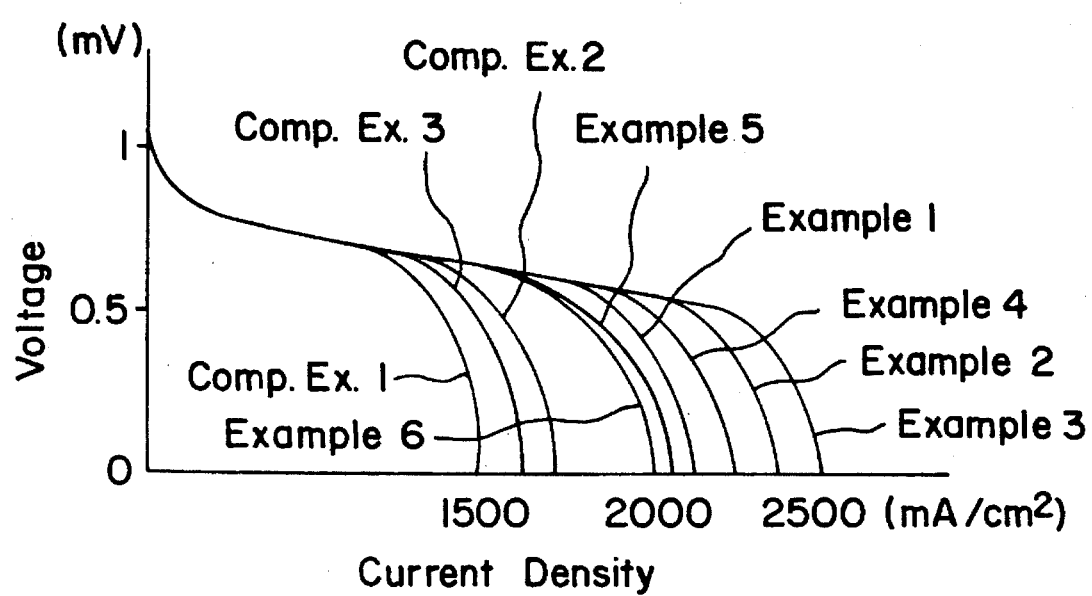
FIG. 8 is a graph showing the relation between the IR free current density (mA/cm$^2$) and the voltage (mV) in the respective fuel cells of Examples 1 to 6 and Comparative Examples 1 to 3.

The results of FIG. 8 were obtained employing the electrode having the electrode surface of 25 cm$^2$ and the oxygen gas having the oxygen flow rate of 1 liter/min. When the oxygen flow rate was decreased to 0.6 liter/min., the current densities of Comparative Examples 1 to 3 were largely decreased, but those of Examples 1 to 6 were scarcely decreased.

On the other hand, as shown in FIG. 4, when apertures 17 having their bottoms were formed which were open to the surface of the cathode current collector 12 in contact with a gas, similar effects to those of Examples 1 to 6 were obtained.

When the respective surfaces of the current collectors 12, 16 in contact with the ion exchange membrane 13 were impregnated with catalyst particles to make the catalyst layers 13, 15 and through apertures 18 which reached to the cathode catalyst layer 13 were formed through the cathode current collector 12, the effects the same as or larger than those of Examples 1 to 6 were obtained.

Examples 7

A platinum-carbon catalyst of which a platinum support amount was 30% in weight was prepared by thermal decomposition treatment of carbon particles having a surface area of 300 m$^2$/g having been impregnated with a chloroplatinic acid aqueous solution (platinum concentration: 5 g/liter) and dispersion of 25% in weight of carbon single fibers having an average diameter of 1 μm based on the support carbon of the support catalyst were dispersed by employing a homogenizer in an Nafion (tradename) solution containing 40% in weight of solids based on the

(16) above total carbon amount, and they were pulverized by simultaneous stirring and drying. The powder thus obtained was redispersed in ethanol for 10 minutes employing a homogenizer, and was allowed to stand on hydrophobically treated carbon paper for 5 minutes for plain sedimentation. Thereafter, a cathode was obtained by sucking and filtrating the solution as it is and hotpressing for binding. An anode was prepared, in the course of the above procedures, by supporting platinum on carbon particles, intertwining Nafion with the carbon particles, filtrating the solution prepared by dispersing in ethanol and transferring it on a hydrophobically treated carbon paper. Fuel cells of the present Examples having a sandwich structure were obtained by disposing an ion exchange membrane between the electrodes.

Example 8

The powder prepared in Example 7 was dispersed with an ultrasonic homogenizer, and transferred onto a hydrophobically treated carbon paper by means of suction filtration without plain sedimentation. Further, powder on the carbon paper, another powder which had been prepared by coating the support catalyst with Nafion in the ratio of (carbon):(Nafion)=5:5 was applied on the above powder on the carbon paper by means of suction filtration without plain sedimentation to constitute an electrode. By employing the electrode, a similar cell to that of Example 7 was assembled.

Examples 9

Similarly to Example 7, the solution prepared by plain sedimentation was plainly sedimented on a carbon paper and filtered, and further on the carbon paper, the same solution of which a ratio of (carbon):(Nafion) was 5:5 was filtered without plain sedimentation to constitute an electrode, and a fuel cell was constituted employing the said electode as Example 7.

Comparative Example 4

An electrode was prepared in accordance with the same procedures of Example 7 except that only suction filtration was conducted without plain sedimentation, and a fuel cell was assembled employing the electrode.

Figure 9:
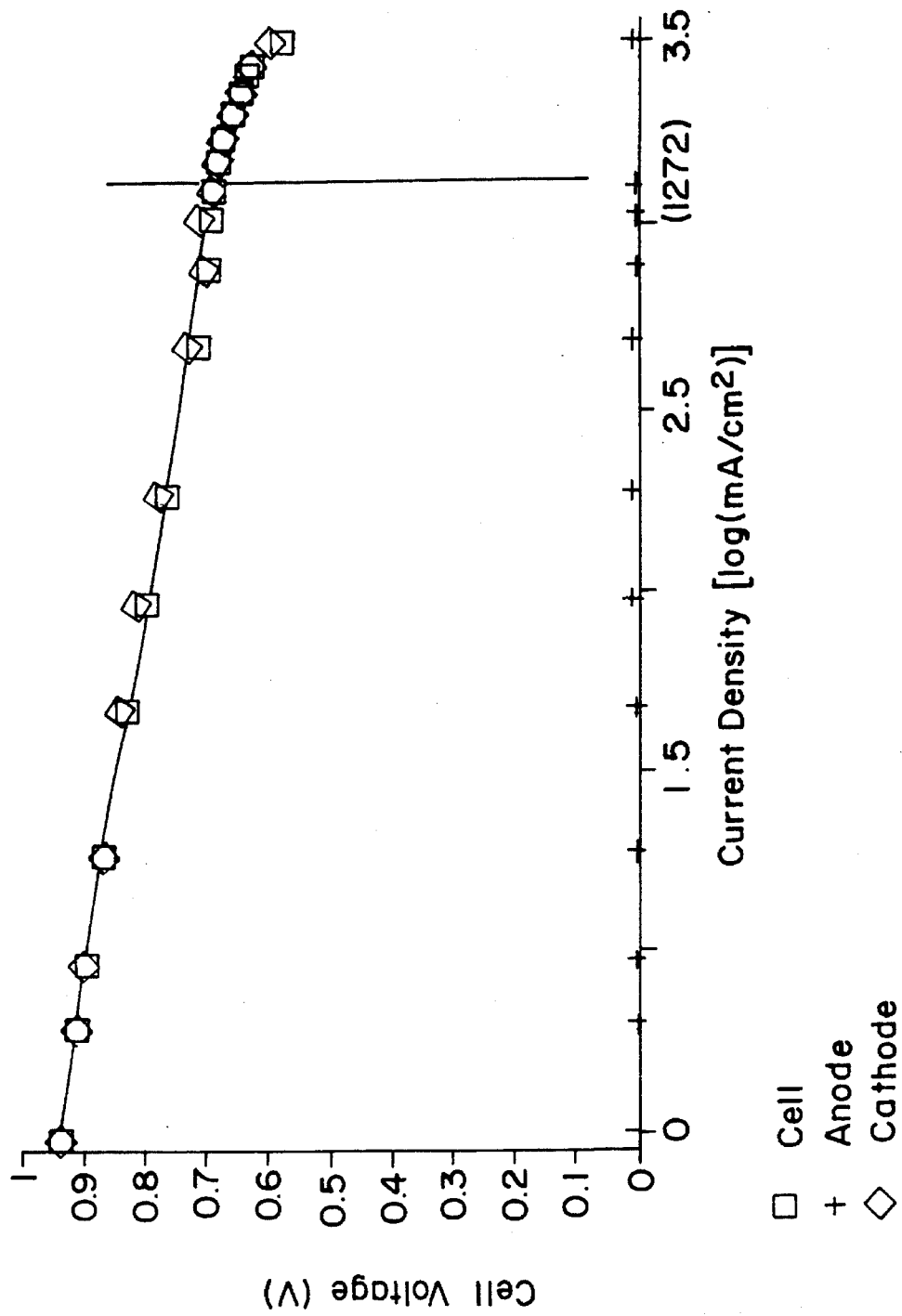
FIG. 9 is a graph showing the relation between the current densities and the cell voltages of Example 7.
Figure 10:
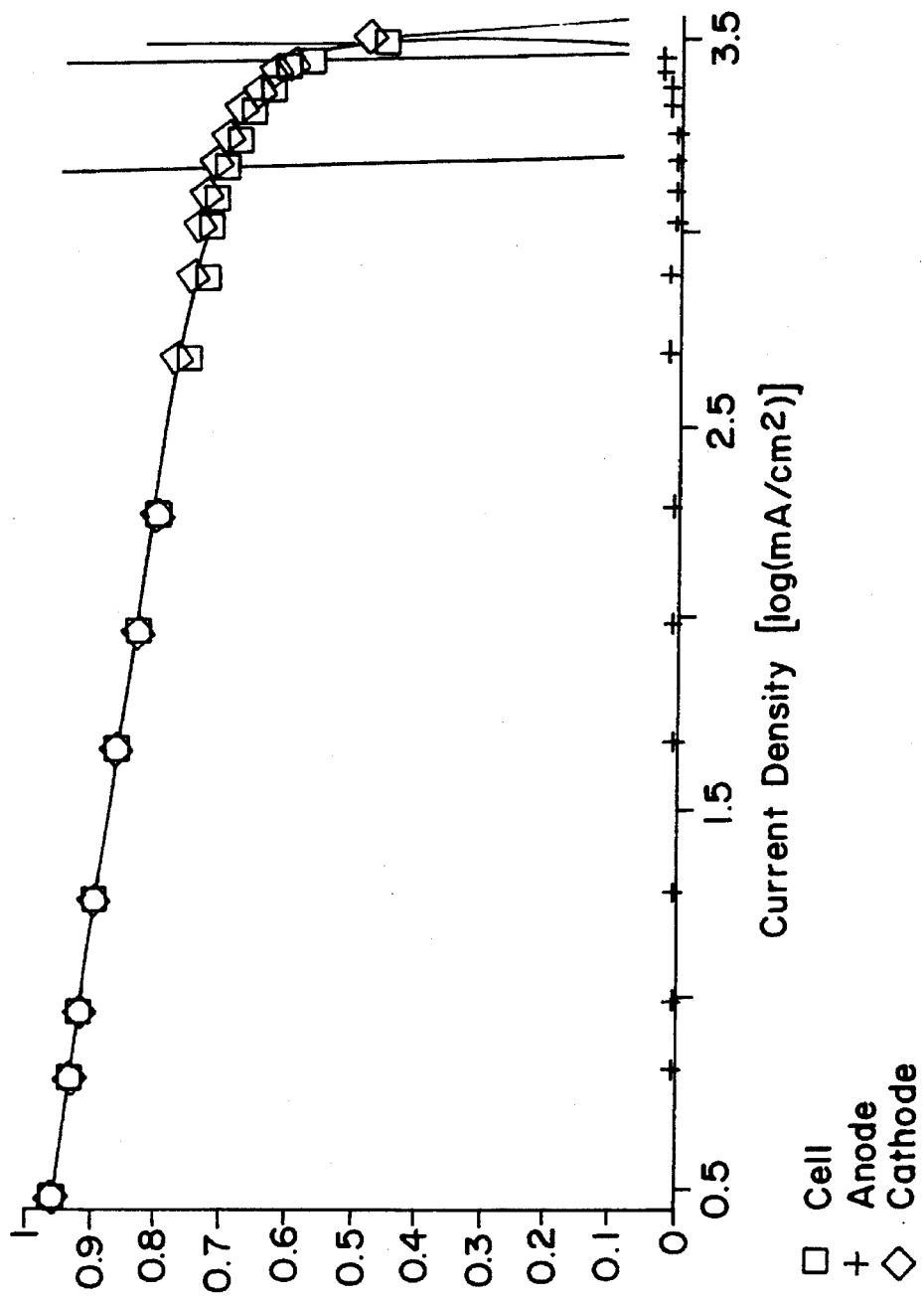
FIG. 10 is a graph showing the relation between the current densities and the cell voltages of Example 9.

The evaluation of performance (current densities obtained at different voltages) of the respective cells of Examples 7 to 9 and Comparative Example 4 was conducted under the folowing conditions. The results thereof are shown in Table 3.
Platinum Loading Amount: 2 mg/cm$^2$
Cell Temperature: 80° C.
Anode Gas Humidifying Temperature: 90° C.
Gas Pressure: Atmospheric Pressure
Gas: Hydrogen and Oxygen The relation between the current densities and the cell voltages of Example 7 is shown in a graph of FIG. 9. The relation between the current densities and the cell voltages of Example 9 is shown in a graph of FIG. 10.

TABLE 3

|  | Example 7 | Example 8 | Example 9 | Comp. Ex. 4 |
| --- | --- | --- | --- | --- |
| Current Density at 0.9 V | 9 mA/cm$^2$ | 9 mA/cm$^2$ | 16 mA/cm$^2$ | 5 mA/cm$^2$ |
| Current Density at 0.7 V | 1300 mA/cm$^2$ | 1250 mA/cm$^2$ | 1500 mA/cm$^2$ | 1000 mA/cm$^2$ |
| Current Density at 0.5 V | 3000 mA/cm$^2$ | 2300 mA/cm$^2$ | 3000 mA/cm$^2$ | 2000 mA/cm$^2$ |

What is claimed is:

1. A polymer electrolyte electrochemical cell comprising, in the following order, a cathode current collector, a cathode catalyst layer, a solid polymer electrolyte membrane, an anode catalyst layer and an anode current collector, the cathode current collector being an electroconductive unwoven fabric and having apertures formed through said fabric so as to allow contact between the catalyst layer and a gas.

2. The electrochemical cell as claimed in claim 1, wherein the apertures are formed through the electroconductive unwoven cloth in the direction of its thickness.

3. The electrochemical cell as claimed in claim 1, wherein the apertures are formed through the cathode essentially consisting of the cathode catalyst layer and the cathode current collector in the direction of its thickness.

4. The electrochemical cell as claimed in claim 1, wherein the diameter of the apertures is between 0.1 mm and 1.0 mm and the number of apertures is not less than 4 apertures/cm$^2$.

5. The electrochemical cell as claimed in claim 4, wherein the diameter of the apertures is between 0.1 mm and 0.5 mm and the number of apertures is between 4 and 20 apertures/cm$^2$.

6. A process of preparing a polymer electrolyte electrochemical cell comprising, in the following order, a cathode current collector, a cathode catalyst layer, a solid polymer electrolyte membrane, an anode catalyst layer and an anode current collector which comprises forming apertures through the cathode current collector composed of an electroconductive unwoven cloth before forming the cathode catalyst layer on the current collector so as to allow contact between the cathode catalyst layer and a gas.

7. A polymer electrolyte electrochemical cell comprising, in the following order, a cathode current collector, a cathode catalyst layer, a solid polymer electrolyte membrane, an anode catalyst layer and an anode current collector, the cathode and anode catalyst layers being formed of cluster particles comprising catalyst particles composed of a catalyst support carrying one or more catalyst metals and ion exchange resin characterized in that the catalyst particles are so distributed that the particle size of the cluster particles of at least one of the two catalyst layers adjacent to the solid polymer electrolyte membrane is smaller than that of the cluster particles adjacent to the current collector.

8. A polymer electrolyte electrochemical cell comprising, in the following order, a cathode current collector, a cathode catalyst layer, a solid polymer electrolyte membrane, an anode catalyst layer and an anode current collector, the cathode and anode catalyst layers being formed of cluster particles comprising catalyst particles composed of a catalyst support carrying one or more catalyst metals and ion exchange resin characterized in that the cluster particles are so distributed that the concentration of the ion exchange resin of at least one of the two catalyst layers adjacent to the solid polymer electrolyte membrane is higher than that of the ion exchange resin adjacent to the current collector.

9. A process of preparing a polymer electrolyte electrochemical cell comprising, in the following order, a cathode current collector, a cathode catalyst layer, a solid polymer electrolyte membrane, an anode catalyst layer and an anode current collector, the cathode and anode catalyst layers being formed of cluster particles comprising catalyst particles composed of a catalyst support carrying one or more catalyst metals and ion exchange resin, which comprises subjecting a dispersion of catalyst particle clusters coated with ion exchange resin to plain sedimentation onto at least one of the two current collectors, and stacking, in the following order, the cathode current collector, the cathode catalyst layer, the solid polymer electrolyte membrane, the anode catalyst layer and the anode current collector.

10. A process of preparing a polymer electrolyte electrochemical cell comprising, in the following order, a cathode current collector, a cathode catalyst layer, a solid polymer electrolyte membrane, an anode catalyst layer and an anode current collector, the cathode and anode catalyst layers being formed by cluster particles comprising catalyst particles composed of a catalyst support carrying one or more catalyst metals and ion exchange resin, which comprises forming a plurality of dispersions of catalyst particle clusters in which ion exchange resin concentrations are different, constituting at least one of the two catalyst layers by disposing the cluster layers with the said dispersions in order of higher concentration with the solid polymer electrolyte membrane containing a lower concentration and the current collector containing the highest concentration and stacking, in the following order the cathode current collector, the cathode catalyst layer, the solid polymer electrolyte membrane, the anode catalyst layer and the anode current collector.

* * * * *